United States Patent [19]

Hall et al.

[11] 3,895,217
[45] July 15, 1975

BEST AVAILABLE COPY

[54] THERMOSTATICALLY CONTROLLED SAFETY HEATER FOR AQUARIUMS

[75] Inventors: Frank Kenneth Hall; Ronald D. Moore, both of Saginaw, Mich.

[73] Assignee: O'Dell Manufacturing, Inc., Saginaw, Mich.

[22] Filed: Jan. 14, 1974

[21] Appl. No.: 433,291

[52] U.S. Cl. .............. 219/523; 200/83 N; 219/331; 219/332; 219/513; 337/117; 337/320
[51] Int. Cl. .......................... H05b 3/80; H05b 1/02
[58] Field of Search ........... 219/210, 331, 332, 333, 219/431, 440, 441, 513, 523; 337/114, 117, 120, 312, 317, 320; 200/83 N, 83 R, 84; 119/5

[56] References Cited
UNITED STATES PATENTS

| | | | |
|---|---|---|---|
| 1,691,749 | 11/1928 | Williams et al. | 219/513 X |
| 2,217,595 | 10/1940 | Morgan et al. | 219/513 X |
| 2,666,838 | 1/1954 | Krah et al. | 219/523 X |
| 2,699,488 | 1/1955 | Arak et al. | 219/523 X |
| 2,811,629 | 10/1957 | Danner | 219/523 |
| 2,822,530 | 2/1958 | Roten | 200/83 N |
| 2,902,581 | 9/1959 | Stiebel | 219/513 |
| 2,987,602 | 6/1961 | Hodges | 219/513 X |
| 3,073,940 | 1/1963 | Brandl | 219/513 |
| 3,107,290 | 10/1963 | Willinger | 219/523 X |
| 3,564,589 | 2/1971 | Arak | 219/331 |

*Primary Examiner*—Volodymyr Y. Mayewsky
*Attorney, Agent, or Firm*—Learman & McCulloch

[57] ABSTRACT

A thermostatically controlled safety heater for immersion in aquarium tanks comprising: a housing having an axially extending heat transmitting tube forming a chamber with linearly heat expansible, heat conducting fluid therein, and an electrically operated heating cartridge immersed in the fluid. An actuating element is provided in the tube in operative contact with the fluid and is movable axially to varying positions dependent on the temperature of the fluid and responsive to its condition of expansion, the element being connected to move linearly and enable and disable contacts which control the temperature of the fluid via enablement and disablement of the heating element to tend to maintain a constant fluid temperature.

10 Claims, 6 Drawing Figures

3,895,217

THERMOSTATICALLY CONTROLLED SAFETY HEATER FOR AQUARIUMS

BACKGROUND OF THE INVENTION

A number of patents have been granted on thermostatically controlled aquarium heaters of the type used by aquarium hobbyists for raising the temperature of aquaria to levels suitable for the maintenance and propagation of the fish therein, and to maintain them at such levels. Prior heating devices have, to my knowledge, been responsive to changes in the temperature of the aquarium water and included bi-metallic strips interposed in the heater element circuit which deflected in accordance with changes in temperature to make and break associated electrical contact members. Certain difficulties have been encountered in conjunction with the use of controls of this character and one of the problems has been that the thermostatic control was responsive only to the temperature of the tank. Thus, so long as the thermostat called for heat, the heater simply became hotter and hotter. If such a heater was removed by the hobbyist, while connected to a power source, as sometimes happens, and placed on a relatively colder surface, (and thus continued to demand heat) the heater could easily overheat and explode.

SUMMARY OF THE INVENTION

An immersion heater for aquarium tanks wherein a principal concern is safety. An axially extending heat transmitting tube has liquid surrounding the heater cartridge which extends axially in the tube. The liquid has an operative relation with an actuator assembly and is linearly expansible to break and make contacts which control the temperature of the liquid via enablement and disablement of the heating element to tend to maintain a constant liquid temperature.

One of the prime objects of the present invention is to provide a heater which is responsive to its own temperature, so to speak, while at the same time being responsive to the temperature of the water in the aquarium tank, so that it is effectively prevented from overheating.

Another object of the invention is to provide a heater element which, as a result, is far safer for hobbyists to use, while still as effective, or even more effective, for accomplishing the purposes for which it was designed.

Still another object of the invention is to provide a heater which operates at lower temperatures and can be built of less expensive plastic materials, and so is extremely economical to manufacture and assemble in mass production operations.

A further object of the invention is to provide a very efficient aquarium heater of attractive appearance.

A still further object of the invention is to provide a heater of the type described which can be preset to provide and maintain the desired tank temperature with considerable accuracy.

Other objects and advantages of the invention will be pointed out specifically or will become apparent to those of ordinary skill in the art from the following description when it is considered in conjunction with the appended claims and the accompanying drawings, in which:

Figure 1:
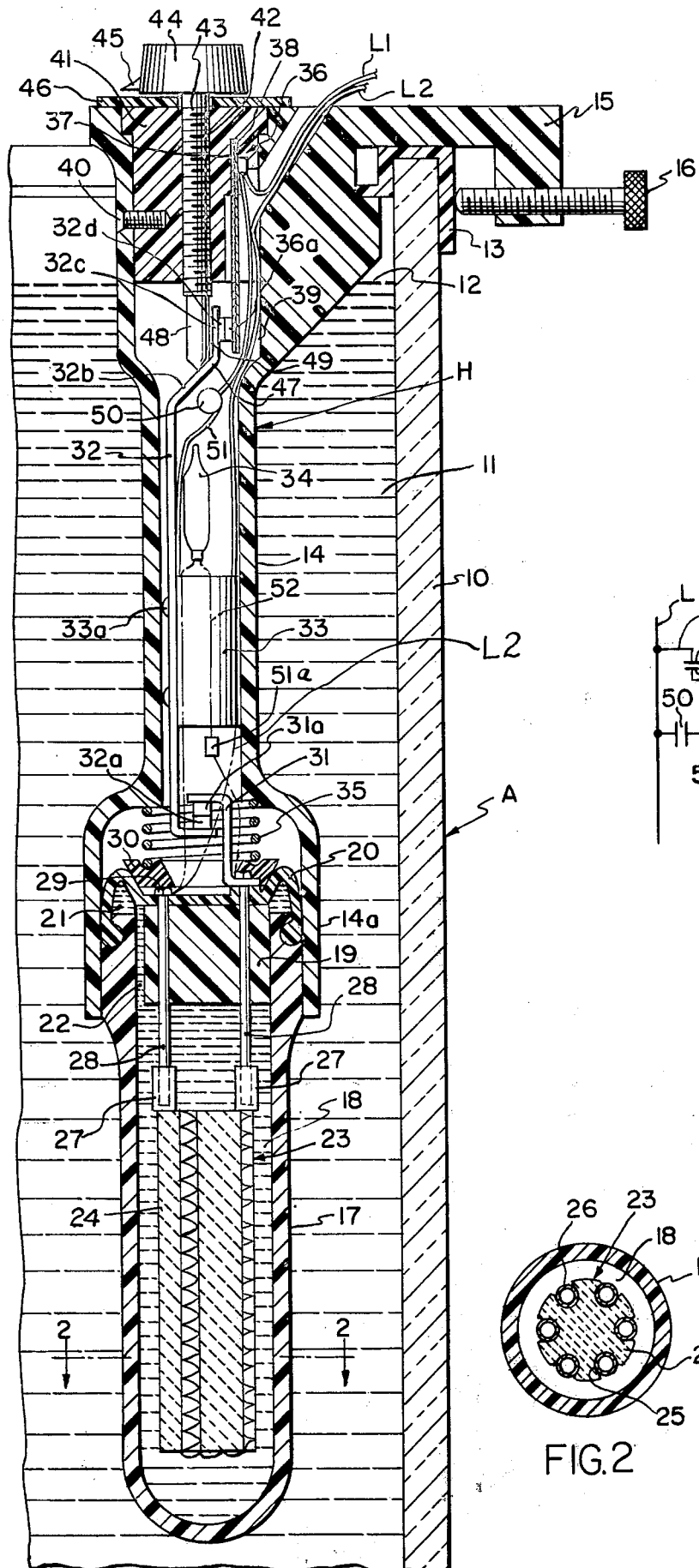
FIG. 1 is a sectional, side elevational view showing a heater fabricated according to the invention mounted in position in immersed condition within an aquarium, the heater being shown in operative energized condition.
Figure 2A:
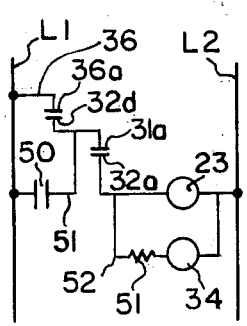
FIG. 2A is a typical schematic view of the electrical circuit used.
Figure 2:
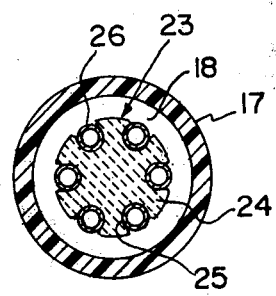
FIG. 2 is a transverse, sectional view taken on the line 2—2 of FIG. 1.

Referring now more particularly to the accompanying drawings and in the first instance to FIGS. 1 and 2, a letter A generally refers to a box-like aquarium constructed of side and end walls 10, sealed in the manner disclosed in the present assignee's U.S. Pat. No. 3,759,224, which is incorporated herein by reference. The aquarium A includes a bottom wall of the design disclosed in the aforementioned patent and it should be noted that the aquarium tank is filled with water 11, to a level 12. A perimetral top frame member of the character disclosed in the aforementioned patent, and generally designated 13, secures the side and end walls 10 at the upper end of the aquarium A.

The heater, which I have generally designated H, includes a preferably plastic upper body or housing 14 having an extending flange 15, which may be secured to the aquarium to support the heater H in place by means of a set screw 16 in the usual manner. Other securing devices may, of course, be efficiently utilized in place of the set screw 16 to clamp the heater in position.

The heater H also includes a tubular lower body part 17 which is received within the enlarged open lower end 14a of the upper body part 14 and fixed in position via a suitable plastic adhesive, or the like. The tubular portion 17 may be formed of a translucent white polyester plastic such as that sold by General Electric Company of the United States under the trademark VALOX, and the upper body portion 14 may be formed of a suitable polycarbonate plastic, such as that sold under the trademark LEXSAN by the same company.

A non-electrically conductive, heat expansible, heat conducting liquid 18, such as a silicone oil (VERSALUBE 1091 sold by General Electric Company may be used) is provided within the chamber provided by tube 17. The open upper end of the tube 17 is closed by a plastic block 19 which is a relative loose fit circumferentially therein so that it easily moves up and down axially in the tube 17. A resilient elastic diaphragm 20 is fixed to the block 19, and the chamber 21 which it defines above the open upper end of tube 17, continuation chamber 21 communicating with the chamber 18 via an axial groove or slot 22 provided in the block 19. Diaphragm 20 may be formed of Nitrile Rubber in substantially the 40 – 55 durometer rating. It is to be understood that the chamber 21, slot 22 and chamber 18 are filled with the heat expansible fluid, the slot 22 functioning to prevent the diaphragm 20 from acting as a pump and creating resistances to free movement of the block 19 in an axial direction.

Submersed in the heating fluid in chamber 18 is a heater or cartridge element, generally designated 23, which, as shown in FIG. 2, includes a ceramic core 24 having circumferentially spaced peripheral grooves 25, within which resistance heating coils 26 are disposed. The coils 26 are electrically connected in series and, at their upper ends, two of them connect to conductive coupler sleeves or socket members 27 which receive electrically conductive brass rods 28 which are fixed in the sleeves 27 so as to suspend the heater cartridge 23 therefrom. Nuts 29, threaded on the upper end rods 28, anchor the central portion of diaphragm 20 in position and provide terminals for wires which connect thereto in a manner which will later be described. It will be noted that a plastic spring seat 30 is recessed to accommodate the nuts 29. Also, it will be observed that a Z-shaped electrically conductive contact bar 31 is fixed to one of the rods 28 by one of the nuts 30 and this rod 31 includes a terminal contact 31a mating with the terminal contact 32a provided on an electrically conductive contact bar 32. The bar 32 is supported by a non-conductive plastic insert 33 which may be adhesively secured in position in the upper body member 14, and which mounts an indicator or glow lamp 34 which, when energized, indicates that current is being supplied to heater 23. The coil spring 35, shown in this construction, may be optionally provided to urge the contact 31a axially in a direction toward contact 32a.

At its upper end contact bar 32, which is fixed to block 33 at 33a, is laterally flexible and includes an inclined portion 32b and a vertically or axial portion 32c, which has a contact 32d thereon. The contact 32d mates with a contact 36a provided on a bi-metallic thermostat assembly, generally designated 36, which may, for example, include brass and nickel strips 37 and 38 in the usual manner. Whereas the contacts 31a – 32a are sensitive to the heat of the fluid 18 in chamber 17, the contacts 32d and 36a are responsive to the heat of the water 11 in the aquarium tank A, via the heat conducted through the upper portion of the upper body section 14 and the air space 39.

At the upper end of the device, screws 40 anchor a block 41, which supports the upper end of the bi-metallic thermostat 36 in axially fixed position, and which is threaded as at 42 to support a threaded adjustment screw 43, on the upper end of which is fixed an adjustment knob 44. The knob 44 includes a pointer member 45 which in the usual manner is adjusted relative to indicia provided on a temperature scale disc 46 which is fixed relative to rotary knob 44. The lower end of screw 43 includes a tapering end portion 47 on a reduced diameter end. Because of the tapered surface 47 provided on screw 43, axial movement of the screw 43 causes lateral movement of the resilient upper end of contact bar 32. Because the bar 32 is fixed to the block 33 however, this lateral movement of the upper end of bar 32 is not transmitted to the lower end of bar 32.

THE ELECTRICAL CIRCUIT

Power is supplied to the device via power source lines $L_1$ and $L_2$ which are connected to a plug which may be plugged into any source of household current, i.e. 110 volt, 60 cycle, alternating current. The contacts 36a – 36d are connected with the contacts 31a – 32a via electrically conductive bar 32 and with heater 23 via electrically conductive bar 31. A capacitor 50 is connected in a parallel circuit line 51 as an anti-sparking device when the points or terminals 36a – 32d are made and a resistor 51a is provided in the circuit line 52 which includes indicator lamp 34 and is connected in parallel with the heater cartridge 23.

THE OPERATION

In practice, and as shown in FIG. 1, the heater 23 is operating when the terminals 36a – 32d and 31a – 32a are made. At this time, the indicator lamp 34 is also energized so that the hobbyist is aware the heater 23 is transmitting heat to the aquarium medium 11. The axially adjustable screw 43 is set, in the first place, so that the vertical portion 32c of conductive bar 32 is in a position to maintain the water temperature at typically 78°F., or within a temperature range of 75° – 80° F. At this setting, and with thermostat 36 in a condition indicating heat is required by medium 11 so that contacts 36a – 32d are closed, the contacts 31a – 32a will also be made and heat will be supplied to the cartridge 23 to maintain the temperature of the fluid 18 in chamber 17 at a predesignated heat transmitting temperature considered safe for operation of the unit, i.e. 150° F. If either the temperature of the fluid in chamber 17, or the temperature of the water 11 in the aquarium A should rise above these predetermined temperatures, the respective contacts 31a – 32a and 32d – 36a would be forced open, thus breaking the circuit to heater 23.

At the same time, if the entire heater assembly were removed from the aquarium while still plugged in to permit the hobbyist to inspect the unit, or while cleaning the tank, the contacts 32a – 31a would break with expansion of the fluid 18 in chamber 17, even though the contacts 32d and 36a were made and, in effect, calling for more heat. Approximately 7/16 of an inch axial movement of block 19 and heater cartridge 23 is possible with the device. This expansion is uniform or linear when the liquid 18 in chamber 17 is within a temperature range of 70° to 500° F and it is found that the temperatures of medium 11 can be maintained to within 1° to 2° centigrade, regardless of variance in the ambient temperature of the room in which the aquarium is disposed or the size of the aquarium.

The contacts 31a – 32a will operate to maintain the temperature of fluid 18, the wires 26 and the tube 17 at a substantially constant temperature and will not allow overheating even when the cartridge is removed from the aquarium.

A MODIFIED EMBODIMENT

Figure 3:
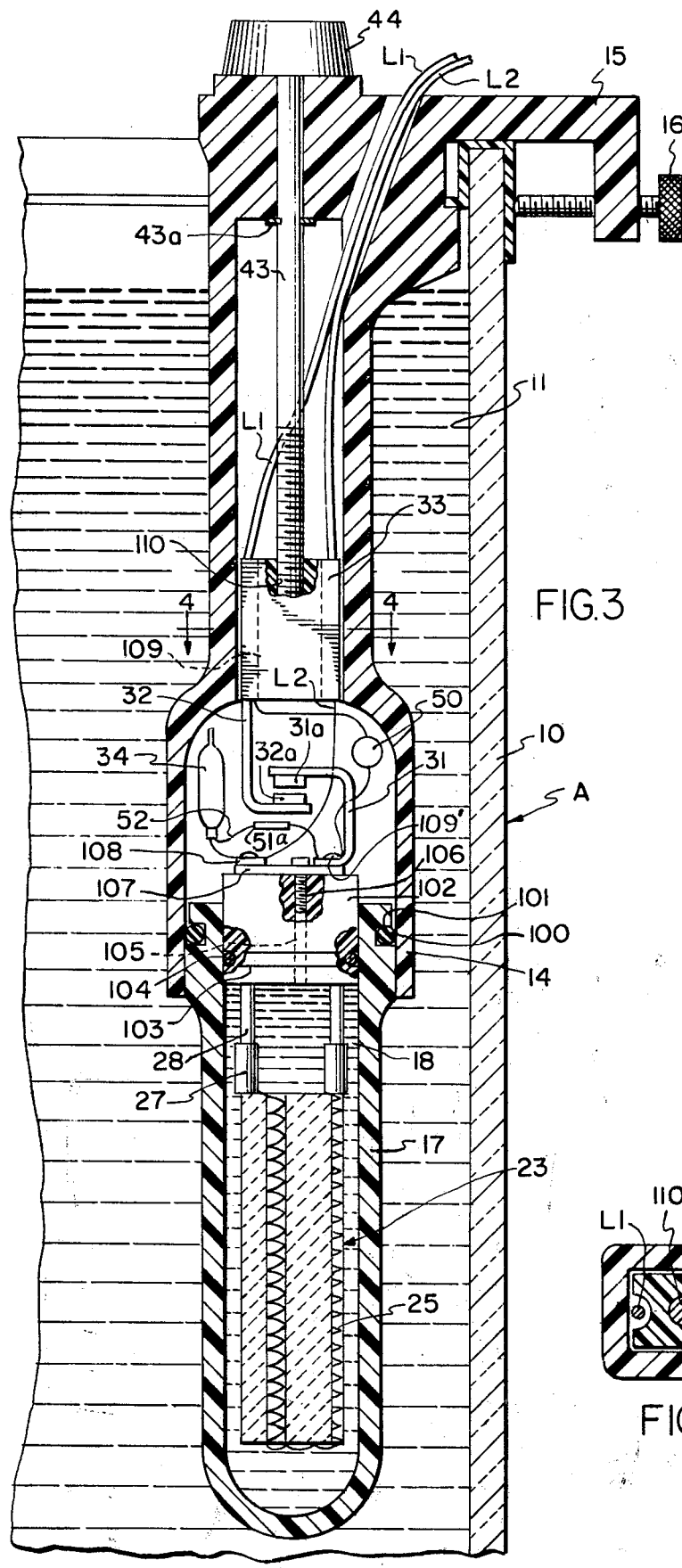
FIG. 3 is a view similar to FIG. 1 showing a modified embodiment of the invention, but with certain parts in disabled position.
Figure 4:
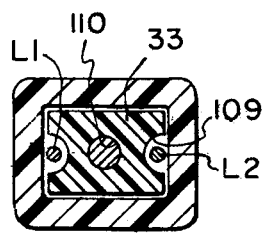
FIG. 4 is a transverse, sectional view taken on the line 4—4 of FIG. 3.

In FIGS. 3 and 4, I have shown a modified form of safety heater assembly in which like or identical parts have been given the same numbers. In this embodiment of the invention, an O-ring seal 100 is provided in a peripheral groove 101 in tubular body 17, which, as previously, received within the upper housing body portion 14 and may be adhesively secured in position. The heater cartridge 23 is identical and identical sockets and rods 27 and 28, respectively, are provided. The block 19 is replaced by a block 102, which supports the rods 28 and cartridge 23, and is movable axially in the chamber 17 with contraction and expansion of the silicone liquid 18 therein. A peripheral groove 103 is provided in block 102 to receive an O-ring seal member 104 and a bore 105 is provided axially through the piston or block 102 to permit the initial escape of air when the piston 102 is initially slid into position in chamber 17. Once this air has escapted, the screw 106 is inserted to prevent any escape of fluid through passage 105.

The conductive bar 31 in this embodiment of the invention, is C-shaped and secured to a non-conductive plate 107 fixed to the top of piston 102. Terminals 108 and 109 are provided to which the ends of indicator lamp wire 52 may secure. The conductive bar 32 is considerably shorter in length and secures directly to a block 33 of different shape. As FIG. 4 indicates, the block 33 has perimetral grooves 109 to receive power source line wires $L_1$ and $L_2$.

Finally, the adjustment screw 43 now threads into a threaded opening 110 provided in the block 33, and manipulation of the knob 44 then axially adjusts the axial position of block 33, bar 32, and the terminal contact 32a, relative to movable terminal contact 31a. Snap ring 43a and knob 44 prevent axial movement of rod 43.

In this version of the invention, the electrical diagram remains essentially the same except that there are no contacts 32d and 36a. The condenser 50 shown is connected in parallel with contacts 31a – 32a to function as an anti-sparking device.

THE OPERATION OF THE MODIFIED EMBODIMENT

In this embodiment of the invention, the heater 23 is energized only when contacts 31a – 32a are in closed position. The contacts will be separated and the heater coils 26 will be deenergized when a predesignated expansion of the liquid 18 in chamber 17 occurs and piston 102 is moved upwardly to separate the contact 31a from the contact 32a. Since the temperature of the liquid 18 is directly responsive to the temperature of the tube 17 and the water 11 in the aquarium, this will only occur after the water in aquarium 11 is heated to a temperature above the desired temperature, typically, for example, 78° F. Until this time the liquid in chamber 17 is transmitting heat from the resistance wire coil 25 to the liquid 11 in a uniform manner and coil 26 and tube 17 do not become overheated. The temperature of the liquid in chamber 17 has been rising with, and in direct proportion to, the temperature in tank 11 during the heat-up period, and thus will become hot enough to cause expansion of the fluid 18 in chamber 17 to raise piston 19 and break contacts 31a – 32a when the temperature of the water and level in the tank reaches the predetermined level. Because liquid 18 is a better and more uniform heat transmitter than air, the heater coils 26 can operate at considerably lower temperatures.

A FURTHER MODIFICATION

Figure 5:
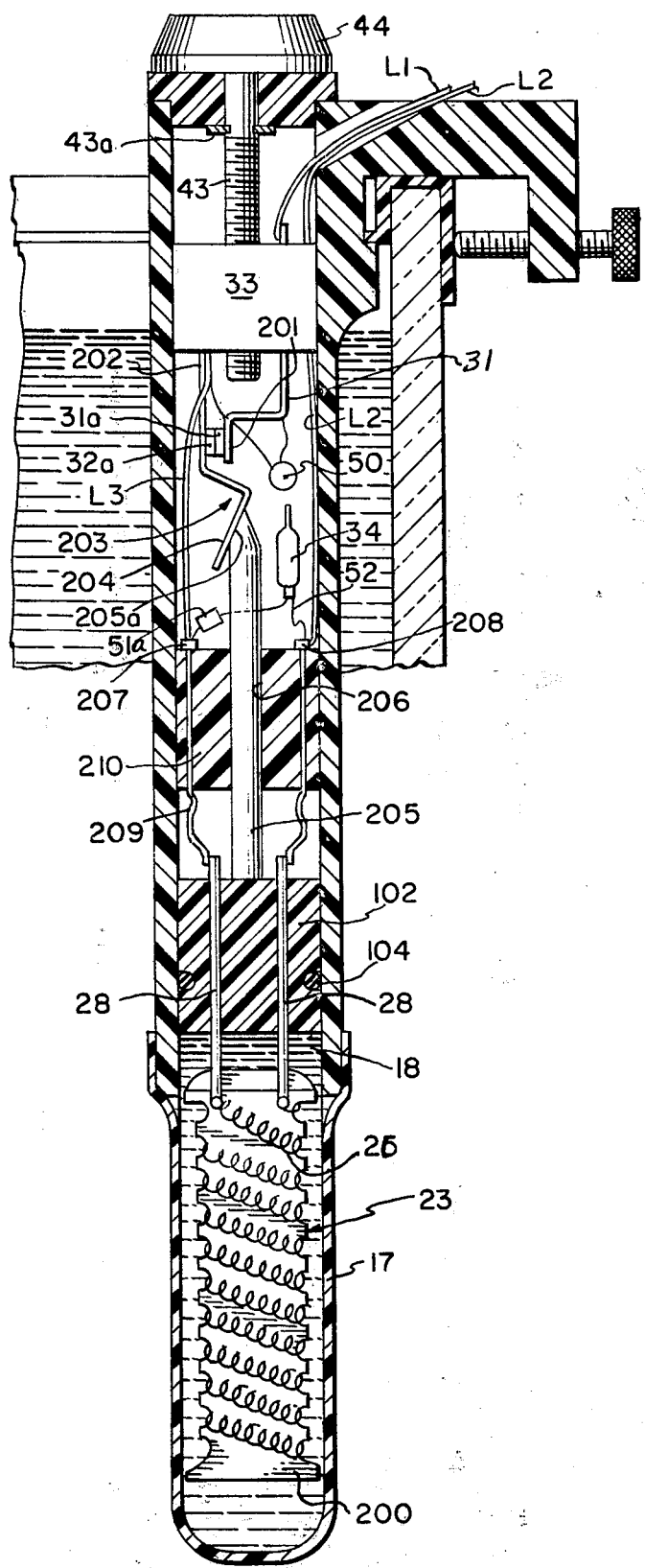
FIG. 5 is a sectional elevational view of a further modified form of the invention.

In FIG. 5, I have shown a modified form of the safety heater assembly disclosed in FIGS. 3 and 4, and in which, again, like or identical parts have been given the same numbers. In this embodiment of the invention, the resistance heating coil 26 is wound around a non-flammable, non-electrically conductive card 200 which similarly is supported by conductive brass rods 28 fixed to a piston member 102 sealed by a peripheral O-ring 104, the opposite ends of the single resistance coil 26 being connected as shown to brass rods 28 which are fixed to card 200.

In this embodiment of the invention, the contacts 32a and 31a are differently supported. An axially or vertically movable block 33 is, however, supported by the adjustment screw 43 as before, and the conductive bar 31 includes a dependent portion 201 supporting the contact 31a. Likewise, a conductive bar 202 extends vertically from block 33 to support the contact 32a and includes a flexible V-shaped lower end, generally designated 203, which includes an axially inclined terminal leg portion 204. The portion 204 is engaged by a pin 205 which is fixed to piston 102 and extends upwardly through a guide slot 206 provided in a block 210 which may be adhesively secured in position in the housing part 14. At its upper free end, the pin 205 has a tapering portion 205a, normally inclined to complement or mate with the inclined leg portion 205.

The condenser 50 is connected in parallel with contacts 31a – 32a as before, and an indicator light 34 is also provided as before, connected to terminals 207 and 208 provided on block 207. Electrically conductive flexible wires 209 extend from the terminals 207 and 208 to connect with the electrically conductive brass rods 28 at their lower ends, and it is plain that the rods 28 may move upwardly with flexing of the wires 209.

As previously, the power source lines L1 and L2 are provided, power line L1 being connected to the conductive rod 201 and power line L2 being connected to the conductive bar 202, which in turn, is serially connected to a line L3, leading to terminal 207 the line 51 for the condensor connects to members 201 and 202 and the line 52 for indicator lamp 34 connects as shown to the terminals 207 and 208.

THE OPERATION

In this embodiment of the invention the heater 23 is energized only when contacts 31a – 32a are made. The contacts will be made and the heater coil 26 energized when a predesignated expansion of the liquid in chamber 18 occurs and piston 102 is moved upwardly, moving pin 205 upwardly at the same time. Movement of the pin 205 upwardly will force the leg 204 in a lateral direction and separate the contacts 31a, – 32a, and these contacts will remain separated as long as the liquid in chamber 17 remains in expanded condition. When the temperature of the liquid 18 in chamber 17 again falls below the predesignated level, the piston 102 and pin 205 will return to the position shown in FIG. 5, and resilient support 202 will spring back to a position in which contacts 31a and 32a are made and current is again conducted to heater coil 26.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

We claim:

1. In a safety heating device for immersion in liquid filled aquariums: a housing including an axially extending heat transmitting synthetic plastic tube with imperforate side walls and an imperforate end wall forming a chamber sealed except at its upper end and having linearly heat expansible, heat conducting liquid therein; an electrical circuit; an electrically operated heater connected in said circuit and extending axially in said tube immersed in said liquid; an actuator assembly for said tube and closing the top thereof in operative contact with said liquid to be reactive to thermal expansion of the liquid while the liquid is in a liquid state, said assembly having a part movable axially and linearly, responsive to temperature change in the liquid, to various positions dependent on the temperature of said liquid to tend to maintain a constant liquid temperature; a switch connected in said circuit with said heater, supported by said housing and comprising first and second electrical contacts insulated electrically from said heater; said linearly movable part being movable to activate and deactivate the switch with expansion and contraction of said liquid to control the temperature of said liquid via enablement and disablement of said heater.

2. The heater of claim 1 wherein said part comprises an axially movable circuit breaker for breaking said contacts.

3. The heater of claim 1 wherein said actuator assembly includes a diaphragm.

4. The heater of claim 1 wherein the heater comprises a resistance wire cartridge suspended from the actuator assembly in said fluid.

5. The heater of claim 1 wherein a bi-metallic thermostat device sensitive to aquarium liquid temperature is connected in said circuit in series with the said contacts.

6. The heater of claim 5 wherein a single axially adjustable conductive contact bar mounts said first contact and has a flexible upper arm part mounting a contact forming part of said thermostat device.

7. The heater of claim 1 wherein a single adjusting screw is mounted by said housing to adjust the position of said first contact and to condition said thermostat device for operation.

8. The heater of claim 1 wherein said part comprises a piston.

9. The device of claim 1 wherein the liquid is a non-electrically conductive silicone oil.

10. The device of claim 1 wherein at least one of said contacts is mounted on a linearly adjustable member; and calibrations for adjusting the member which relate to the linear expansion of the liquid in which the heater is immersed are provided.

* * * * *

UNITED STATES PATENT OFFICE
CERTIFICATE OF CORRECTION

Patent No. 3,895,217  Dated July 15, 1975

Inventor(s) Frank Kenneth Hall and Ronald D. Moore

It is certified that error appears in the above-identified patent and that said Letters Patent are hereby corrected as shown below:

Column 2, line 54, before "chamber" insert --continuation--.

Column 2, line 56, cancel "continuation".

Column 7, line 7, before "linearly" insert --axially and--.

Signed and Sealed this fourth Day of November 1975

[SEAL]

Attest:

RUTH C. MASON
*Attesting Officer*

C. MARSHALL DANN
*Commissioner of Patents and Trademarks*